(12) United States Patent
Nadler et al.

(10) Patent No.: US 12,363,437 B2
(45) Date of Patent: Jul. 15, 2025

(54) SYSTEM AND METHOD FOR PROCESSING IMAGES RELATED TO TARGET REGION

(71) Applicant: Darvis Inc., San Francisco, CA (US)

(72) Inventors: Ingo Nadler, Bad Breisig (DE); Jan-Philipp Mohr, Hamburg (DE); Paul Warren, White Plains, MD (US)

(*) Notice: Subject to any disclaimer, the term of this patent is extended or adjusted under 35 U.S.C. 154(b) by 35 days.

(21) Appl. No.: 17/906,135

(22) PCT Filed: Mar. 15, 2021

(86) PCT No.: PCT/IB2021/052135
§ 371 (c)(1),
(2) Date: Sep. 12, 2022

(87) PCT Pub. No.: WO2021/181367
PCT Pub. Date: Sep. 16, 2021

(65) Prior Publication Data
US 2023/0113310 A1 Apr. 13, 2023

Related U.S. Application Data

(60) Provisional application No. 62/988,936, filed on Mar. 13, 2020.

(51) Int. Cl.
*H04N 23/695* (2023.01)
*H04N 23/698* (2023.01)

(52) U.S. Cl.
CPC ......... *H04N 23/695* (2023.01); *H04N 23/698* (2023.01)

(58) Field of Classification Search
CPC .... H04N 23/695; H04N 23/698; H04N 23/81; G06T 15/205; G06T 3/12
See application file for complete search history.

(56) References Cited

U.S. PATENT DOCUMENTS

| | | |
|---|---|---|
| 2010/0002071 A1* | 1/2010 Ahiska | H04N 23/661 348/240.99 |
| 2013/0051478 A1* | 2/2013 Wu | H04N 19/44 375/E7.027 |
| 2013/0265420 A1* | 10/2013 Adachi | G06V 20/52 348/143 |

\* cited by examiner

*Primary Examiner* — Kathleen V Nguyen
(74) *Attorney, Agent, or Firm* — RC Trademark Company (57) ABSTRACT

Disclosed is a system (100) for processing images related to a target region. The system comprises a memory (102) and a computing arrangement (104) in communication with the memory. The computing arrangement is configured to define one or more target buffers (106) in the memory of a size corresponding to one or more image parameters to be used as an input to a model implemented for the processing the images. The computing arrangement is further configured to receive at least one image (300, 400A, 400B, 400C, 400D) of the target region from a wide-angle camera (108, 202), define two or more virtual camera views (302, 304, 306, 412, 416, 418, 420, 422) and process the at least one image to generate two or more virtual images (308, 310, 312, 400E) based on the defined one or more target buffers and the defined two or more virtual camera views. The computing arrangement is further configured to implement the said model to analyse the generated two or more virtual images.

13 Claims, 9 Drawing Sheets

SYSTEM AND METHOD FOR PROCESSING IMAGES RELATED TO TARGET REGION

TECHNICAL FIELD

The present disclosure relates generally to image processing related to a target region and more specifically, to a system and a method for processing images captured by a wide-angle lens-based camera by implementing a model trained for typical images captured by a normal lens-based camera.

BACKGROUND

Currently video surveillance, autonomous driving algorithms and most computer vision systems use perspective cameras with normal lenses. One of the problems with such cameras is that they principally cover only a limited field of vision, about 60 degrees or so, depending on the optical lens used. Moreover, such cameras can only cover a field of view in one direction which severely limits coverage area. In cases where a large area, such as a crossroad or a hallway, needs to be covered, multiple cameras need to be installed.

In order to cover a large area by using a single camera, conventionally, 360° wide-angle cameras, also known as fisheye cameras are employed. Such cameras deliver a field of vision of approximately 180×180 degrees, perpendicular to their viewing axis. However, such wide-angle cameras bear fundamental disadvantages. They distort the image closer to the edge of a wide-angle lens. Also, their resulting image is heavily warped due to a fisheye effect. This makes it hard for humans watching a fisheye live feed to recognize depicted objects and almost impossible for computer vision algorithms to recognize depicted objects as the warping of the depicted objects depends on its position within the fisheye image.

Consequently, artificial intelligence models which may be employed for such computer vision algorithms cannot be trained easily for wide-angle cameras. Additionally, most computer vision-based object detection algorithms use the image with a rather small resolution as an input. The fisheye image is typically quadratic in shape with generally very high resolution, for example, 2000×2000 pixels. When processing the fisheye image in the said computer vision-based on object detection algorithms, the image has to be scaled down to match the pipeline's input size, such as, 416×416 for a YoloV3 object detector. This causes a massive loss of information as many of the pixels get discarded. Further, in order to obtain a resultant image that matches the image resolution of the input of the computer vision object detectors, typically, de-warping or rectification on the entire fisheye image is performed. The resulting image is a large, less distorted image which still has strong curvature on lines perpendicular to the wide-angle camera and is hence, not well suitable for processing in computer vision algorithms like the computer vision object detectors.

Therefore, in light of the foregoing discussion, there exists a need to overcome the aforementioned drawbacks associated with techniques for processing wide-angle images of a target region.

SUMMARY

The present disclosure seeks to provide a system and a method for processing images related to a target region. An aim of the present disclosure is to provide a solution that overcomes at least partially the problems encountered in prior art, and provides an improved system and method for processing images related to the target region. The present disclosure seeks to provide an alternative solution to the existing technique of conventional de-warping or rectification techniques for analysis of wide-angle images in which wide-angle images are scaled down which causes loss of information as pixels get discarded to match a model implemented for analysing the images. In the present disclosure, the system and the method provide techniques to analyse wide-angle images by generating two or more virtual images with minimal loss of information.

In an aspect, the present disclosure provides a system for processing images related to a target region, the system comprising:
a memory; and
a computing arrangement in communication with the memory, the computing arrangement configured to:
define one or more target buffers in the memory of a size corresponding to one or more image parameters to be used as an input to a model to be implemented for the processing the images;
receive at least one image of the target region from a wide-angle camera;
define two or more virtual camera views from the received at least one image to be utilized for processing images related to the target region;
process the at least one image to generate two or more virtual images based on the defined one or more target buffers and the defined two or more virtual camera views; and
implement the said model to analyse the generated two or more virtual images.

In another aspect, the present disclosure provides a method for processing images related to a target region, the method comprising:
defining one or more target buffers in a memory of a size corresponding to one or more image parameters to be used as an input to a model to be implemented for the processing the images;
receiving at least one image of the target region from a wide-angle camera;
defining two or more virtual camera views from the received at least one image to be utilized for processing images related to the target region;
processing the at least one image to generate two or more virtual images based on the defined one or more target buffers and the defined two or more virtual camera views; and
implementing the said model to analyse the generated two or more virtual images.

Embodiments of the present disclosure substantially eliminate or at least partially address the aforementioned problems in the prior art, and enable truthful processing of images related to the target region.

Additional aspects, advantages, features and objects of the present disclosure would be made apparent from the drawings and the detailed description of the illustrative implementations construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides a system for processing images related to a target region, the system comprising:
- a memory; and
- a computing arrangement in communication with the memory, the computing arrangement configured to:
  - define one or more target buffers in the memory of a size corresponding to one or more image parameters to be used as an input to a model to be implemented for the processing the images;
  - receive at least one image of the target region from a wide-angle camera;
  - define two or more virtual camera views from the received at least one image to be utilized for processing images related to the target region;
  - process the at least one image to generate two or more virtual images based on the defined one or more target buffers and the defined two or more virtual camera views; and
  - implement the said model to analyse the generated two or more virtual images.

In another aspect, the present disclosure provides a method for processing images related to a target region, the method comprising:
- defining one or more target buffers in a memory of a size corresponding to one or more image parameters to be used as an input to a model to be implemented for the processing the images;
- receiving at least one image of the target region from a wide-angle camera;
- defining two or more virtual camera views from the received at least one image to be utilized for processing images related to the target region;
- processing the at least one image to generate two or more virtual images based on the defined one or more target buffers and the defined two or more virtual camera views; and
- implementing the said model to analyse the generated two or more virtual images.

The present disclosure seeks to provide a system and a method for processing images related to a target region. Herein, the target region may be a room, a hall, a crossroad and the like, whose image needs to be analysed. Herein, the processing of images may be done for a real-time surveillance of the target region. Herein, surveillance may be done to monitor activities inside the target region. The system and the method of the present disclosure is implemented to detect, track and classify objects in the target region using just one wide-angle camera.

The system comprises the memory. It may be appreciated that the memory may be a storage device used for storing data and instructions relating to a computing arrangement. Throughout the present disclosure, the term "memory" as used herein refers to a volatile or persistent medium, such as an electrical circuit, magnetic disk, virtual memory or optical disk, in which a computer can store data or software for any duration. The memory may be non-volatile mass storage such as physical storage media. Furthermore, the memory can be distributed in a scenario wherein the system is distributed. In the present examples, the memory may be implemented as any suitable computer usable or computer readable medium (or media). The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick or a floppy disk having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

The system further comprises the computing arrangement in communication with the memory. Herein, the computing arrangement may include a processor configured to process the images related to the target region. It may be appreciated that the processor, also known as, a central processing unit (CPU) is a brain of the computing device, which may be in the form of, but not limited to, a desktop, a mobile phone, a laptop and a palmtop. Throughout the present disclosure, the term "processor" as used herein relates to a computational element that is operable to respond to and processes instructions that drive the apparatus. The processor may include, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. The "processor" of the computing arrangement, in general, refers to a computational logic or part of the server arrangement. A software code which is executed in the server arrangement runs in the processor. In an example, there can be several processors running in parallel to execute the software code in the computing arrangement. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the computing arrangement. As discussed, the computing arrangement of the present disclosure is in communication with the memory. In an embodiment, the memory may reside inside the computing arrangement. In another embodiment, the memory may reside outside the computing arrangement.

The computing arrangement is configured to define one or more target buffers in the memory of a size corresponding to one or more image parameters to be used as an input to a model to be implemented for the processing the images. It may be understood that the target buffer may be a region/space in the memory used to store data temporarily. In the present implementation, the model may be an artificial intelligence model using a computer vision algorithm employed for processing the images. The model may be used for object detection, tracking and classification in the image. The image parameters may be image resolution and bit depth. It will be appreciated that the model may take images with some specific image parameters as the input. Typically, most models may take images having smaller resolution and/or lower bit depth as the input. For example, in an embodiment, the model may take images with 416×416 resolution as the input. Herein, if the image with resolution higher than 416×416 is given as the input, the model may not be able to process the image and the image may need to be scaled down before feeding it to the model.

The one or more image parameters may comprise at least one of image resolution and bit depth. Image resolution refers to details that the image has. The higher the image resolution, the greater are the details in the image. Typically, the image resolution may indicate the number of pixels in a horizontal direction and the number of pixels in a vertical direction. For example, the image having the image resolution as 600×400, has 600 pixels in the horizontal direction and 400 pixels in the vertical direction. The bit depth refers to the number of bits needed for representing one pixel in the image. For a colour image, the bit depth may represent the number of bits needed to represent one colour component per pixel. For example, for a red-green-blue (RGB) image, the bit depth may be the number of bits needed to represent a red component or a green component or a blue component per pixel of the image. As discussed, one or more target buffers may be defined in the memory of the size corresponding to one or more image parameters. For example, in an embodiment, a required number of target buffers may be defined, each with 416×416 image resolution and 8-bit or 16-bit bit depth for further processing, so as to enable the implemented model for processing of the images in the defined target buffers.

The computing arrangement may be configured to receive at least one image of the target region from a wide-angle camera. Herein, the wide-angle camera may comprise a wide-angle lens having a larger field of vision. It may be appreciated that the field of vision may be the extent of region that the wide-angle lens may capture. Typically, the wide-angle camera may include wide-angle lenses having field of vision greater than 60°. Herein, the image captured by the wide-angle camera may be referred to as a wide-angle image. In an embodiment, the at least one image may be a wide-angle image frame of a live stream video recorded by the wide-angle camera. In another embodiment, the at least one image may be received by filtering the wide-angle image frames received from the live video stream. Herein, only relevant wide-angle image frames may be retained for processing by the system. The irrelevant wide-angle image frames may be discarded. This may help in reducing the time needed to process the at least one image by the system, as for the said purposes of video surveillance or the like.

The wide-angle camera may be a fisheye camera. Typically, the fisheye camera includes an ultra-wide-angle lens, also known as, a fisheye lens, that captures the image which may be a panoramic or a hemispherical image. The fisheye lens may have 360 degrees field of vision. That is, the field of vision perpendicular to a viewing axis of the fisheye lens may be 180×180 degrees. Hence, contrary to conventional lenses, the fisheye lens may capture larger target regions. This eliminates the need of using multiple cameras for covering a large target region. That is, unlike the conventional camera, for example, with the conventional camera having a 36mm lens that translates to about 53×41 degrees field of vision, the fisheye camera provides a field of vision of 180×180 degrees, or for example, 180×90 degrees. With such a large field of vision, unlike the conventional camera, the fisheye camera may provide view along multiple directions, for example, one downward facing fisheye camera mounted to a ceiling right above cross roads may replace four conventional cameras pointed at each direction, respectively. It may be noted that the fisheye camera may also record a video comprising a plurality of wide-angle image frames. In an embodiment, the fisheye lens may live stream video. In such cases, the image received by the computing arrangement may be any one of the wide-angle image frames from the plurality of wide-angle image frames.

It may be appreciated that the resolution of the at least one image received from the wide-angle camera may be significantly large, to be directly implemented by a traditional model for video surveillance or the like. For example, the resolution of the at least one image received from the wide-angle camera may be about 2000×2000. That is, the number of pixels horizontally is 2000 and the number of pixels vertically is 2000 for the image. As discussed, the model may analyse those images as input which is of much lower image resolution. For example, the model may process images that have image resolution of 400×400 as the input. In such a case, the implemented model may not be able to analyse the at least one image received from the wide-angle camera as the input.

In the embodiments of the present disclosure, the at least one image received from the wide-angle camera is divided into multiple images before inputting those to the model. For example, in an embodiment, the at least one image received from the wide-angle camera has a resolution of 2000×2000, and the implemented model may be configured to use images of a resolution less than 2000×2000 as the input. In such cases, instead of directly inputting the at least one image received from the wide-angle camera to the model, a plurality of virtual images, which when combined may form the wide-angle image, may be generated and provided as the input to the model. For this purpose, a plurality of target buffers may be defined in the memory which may be suitable to temporarily store the said generated plurality of virtual images of less than 2000×2000 resolution, for further processing.

The computing arrangement is further configured to define two or more virtual camera views from the received at least one image to be utilized for processing images related to the target region. The two or more virtual camera views may correspond to views being captured from two or more virtual cameras looking into defined directions within the wide-angle camera's field of vision. That is, the two or more virtual camera views may be defined as camera views needed when instead of the wide-angle camera, cameras with normal lenses are implemented. For instance, traditionally ten cameras with normal lenses may be utilized, pointing in different directions to cover the target region fully, and the video streams from the said ten cameras may be taken and fed to the model for analysing. However, instead of installing ten separate cameras, the system and the method of the present disclosure may utilize a single wide-angle camera and may define ten virtual camera views within the field of vision of the wide-angle camera, which corresponds to the views provided by the said ten cameras with normal lenses as may have been utilized traditionally. In some embodiments, a user interface may be provided which allows a user to configure a video stream of the wide-angle camera to define the two or more virtual camera views looking into required direction within the field of vision of the wide-angle camera. Such user interface may be contemplated by a person skilled in the art and thus has not been described herein for the brevity of the present disclosure.

Defining the two or more virtual camera views may be based on one or more of a horizontal resolution of the received at least one image, a vertical resolution of the received at least one image, a horizontal field of vision in the received at least one image and a vertical field of vision in the received at least one image. Herein, the horizontal resolution of the received at least one image may be the number of pixels in horizontal direction. That is, it may be the number of pixels per row of the received at least one image. The vertical resolution of the received at least one image may be the number of pixels in vertical direction. That is, it may be the number of pixels per column of the received at least one image. It may be appreciated that the field of vision may be the region of space that the lens may capture. The field of vision may be measured in degrees. The horizontal field of vision may be the angle of a horizontal arc captured by the lens. The horizontal field of vision in the received at least one image may be the angle of the horizontal arc covered by it. The vertical field of vision may be the angle of a vertical arc captured by the lens. The vertical field of vision in the received at least one image may be the angle of the vertical arc covered by the image. The two or more virtual camera views may be defined based on one or more of the horizontal resolutions of the received at least one image, the vertical resolution of the received at least one image, the horizontal field of vision in the received at least one image and the vertical field of vision in the received at least one image.

Defining the two or more virtual camera views may be based on one or more of a pan, a tilt and a roll required for the two or more virtual camera views, in view of the received at least one image. Typically, the pan may be an angle by which the camera may be rotated along the Y axis in order to capture images. The tilt may be the angle by which the camera may be rotated along the X axis in order to capture images. The roll may be the angle by which the camera may be rotated along the Z axis in order to capture images. The pan, the tilt and the roll required for the two or more virtual camera views may be the angles by which the two or more virtual cameras may be rotated along Y axis, X axis and Z axis respectively for defining the two or more virtual camera views.

In an embodiment, the at least one image may be first processed to crop the at least one image before defining the two or more virtual camera views. Herein, the at least one image may be cropped such that only portions of the at least one image that may be relevant for the model may be retained and unwanted portions may be discarded. This further reduces time needed by the model to analyse the cropped at least one image and holds particular importance when the at least one image is received from the live video stream, as the at least one image needs to be analysed before another image from the live video stream is received.

The computing arrangement is further configured to process the at least one image to generate two or more virtual images based on the defined one or more target buffers and the defined two or more virtual camera views. The generated two or more virtual images may be the virtual images as seen by the two or more virtual cameras. The two or more virtual images are generated such that the image parameters thereof may match with the input parameters as per the implemented model for the processing the images. It may be appreciated that for each virtual camera view, one virtual image may be generated. In order to do so, the two or more target buffers may be filled pixel by pixel by carving out pixels from the at least one image and recalculated by a suitable algorithm as known in the art. The algorithm may take position of objects and the field of vision comprising angle of vision and spherical curvature of the two or more virtual cameras in order to recalculate and obtain the two or more virtual images having no spherical curvature in it. In an embodiment, for each pixel, say (h,v), in the target buffer and for each neighbouring subpixel, first, a spherical vector to a target pixel may be calculated. Second, the spherical vector may be transformed with tilt, roll and pan angles, and then converted to theta and phi coordinates of the wide-angle image. Third, the theta and phi coordinates of the wide-angle image may be mapped to the coordinates of the received at least one image. Subsequently, RGB values of sampled subpixels may be summed and a resultant pixel colour may be written in the one or more target buffers.

In an embodiment, a perspective view generation software that typically runs on a graphical processing unit (GPU) may be employed to process the at least one image to generate two or more virtual images. Herein, for each of the two or more virtual camera views, the corresponding part of the at least one image as received from the wide-angle camera may be copied into the one of the defined target frames at the defined resolution for further processing. For this purpose, some known techniques, such as pixel-sub-sampling and antialiasing, may be applied to avoid flicker and pixelization.

The computing arrangement is further configured to implement the said model to analyse the generated two or more virtual images. Herein, the model may be a computer vision-based software such as, YoloV3 object detector as known and widely used in the art, which may utilize a convolutional neural network or the like. In the present system, with at least one image of the target region, as captured by the wide-angle camera, has been processed to generate two or more virtual images, such model is able to process the generated two or more virtual images for further analysis.

As discussed, the model may be the artificial intelligence (AI) model. The model may be trained by using the machine learning process. Herein, first a data may be received. Next, the data may be transformed into features for which the model needs to be trained. For example, if the model needs to be trained for object detection, the data may be a plurality of images of the target region and the features may be objects present. Once, the data is transformed, a training dataset and a test dataset may be defined. A plurality of models may be trained by using the training dataset. The models from the plurality of models that are best may be tested based on the test dataset to determine performance of the models. If the performance is good, the model for which the performance is good may be deployed, which may often involve converting it to a more efficient format and putting it in a platform for integrating it with rest of software.

For example, the model may be deployed on a server, edge devices, such as, the wide-angle camera itself, mini-servers near the wide-angle cameras, individual floors or in individual facilities, with non-AI processing being done either on that same server, a different server, or in a cloud. It may be appreciated that typically, once deployed, AI model may wait for a new image to be sent to it. Next, the AI model may pre-process the new image and may run inference on the new image by analysing it to obtain an inference result. The obtained inference result may, then, be post-processed and sent to a next step in a pipeline. The said model of the present disclosure may also follow the above steps on a new image. Herein, the new image may be the generated two or more virtual images, as described above.

The said model may be implemented to analyse the generated two or more virtual images for at least one of an object detection, an object tracking and an object classification, in the target region. It may be appreciated that the object detection may be a type of image processing and computer vision technique used for detecting objects such as, but not limited to, boxes, doors, stretchers and humans in the generated two or more virtual images. The object tracking may be the type of image processing and computer vision technique used for tracking the movement of the object. For example, in an embodiment, the object tracking may be employed to track the movement of people inside a hospital. Herein, an algorithm for the object tracking may be applied to detect objects in the generated two or more virtual images. Herein, the algorithm may take view directions of the virtual camera views into account so that it knows when the object leaves or reappears. For example, a 'View-1' may be put on focus if any object leaves from a particular exit and a 'View-2' may be put on focus if any object reappears from a particular entry, or the like. Thus, the objects detected by the model may be tracked across neighbouring two or more virtual cameras. It may be appreciated that the object classification may be the type of image processing and computer vision techniques used for classifying the objects present in the two or more virtual images based on predefined classes. For example, in an embodiment, the object classification may place doors and tables detected in the two or more virtual images under a static class which indicates objects that do not move.

The model may be also used to analyse the generated two or more virtual images for uniquely identifying objects as they move around in a portion of the target region inside the field of vision of a single camera and/or as they move around the entire target region moving from field of vision of one virtual camera view to another. The model may uniquely identify objects by using elements like appearance, velocity, position, historical patterns, license plate recognition, barcode or QR code reading, and states, such as, whether a stretcher in the hospital is clean, unclean or occupied. The model may uniquely identify objects in order to probabilistically provide identification (ID) for the uniquely identified objects as it moves around the target region.

It may be noted that the system and the method of the present disclosure may include a plurality of models working together rather than one single model. For example, a first model may be used for the object detection in the generated two or more virtual images, a second model may be used to zoom in to individual objects and detect states of the detected objects, a third model may be used that may employ the detected state to guess ID of a particular object or to assign a new ID if the model is unable to guess the ID, a fourth model may be used that may employ current and recent history of where all of objects are on the target region to predict what's going to happen in near future such as, next couple of minutes, next couple of hours, next few days or next few weeks and a fifth model may be used that may take results of all above models and to recommend best action for a particular worker or a particular object for optimal efficiency.

In an embodiment, the generated two or more virtual images may be analysed serially one by one. That is, first, a first image of the generated two or more virtual images may be analysed and the process may be repeated for subsequent generated two or more virtual images one by one. However, when at least one image is received from the wide-angle camera that is recording live video streams, this technique may not be effective. As the two or more virtual images are analysed serially, a processing time may increase and may not match with a frame rate of the video stream of the wide-angle camera. For example, in an embodiment, the wide-angle camera may be positioned on an autonomous vehicle (AV) for recording live video streams of its surroundings. Herein, the at least one image may be one image frame of the live video streams. The at least one image may be received by the system. The system may generate the two or more virtual images and may then analyse it. In such cases, until and unless each of the two or more virtual images may not have been analysed, the AV cannot move forward or backward. In case the two or more virtual images are analysed serially, the processing time of the system needed to analyse the two or more virtual images may increase, or there may be a mismatch between the processing time needed by the system and a frame rate of live video streams which may be detrimental.

The computing arrangement may comprise multiple processing threads, and wherein each of the generated two or more virtual images is analysed in one of the multiple processing threads therein. It may be appreciated that the processing threads may be a unit of execution. In order to match the frame rate of the wide-angle camera video stream with the processing speed, in an embodiment multiple processing threads may be employed. Herein, each of the generated two or more virtual images may be analysed in one of the multiple processing threads. Thus, the generated two or more virtual images may be analysed parallelly which may increase the processing speed of the system. In another embodiment, in order to match the number of generated virtual images from the at least one image of the wide-angle camera, a corresponding number of processing threads may be employed. Herein, each of the generated two or more virtual images may be analysed in one of the multiple processing threads in the computing arrangement.

In an embodiment, the system may receive historical data for spatial or temporal analysis. Herein, the system may quantitatively identify hotspots of activity as well as areas that don't have a lot of activity in the target region which may be informed to operations managers so that they may utilize space in the target region more efficiently. The system may also create a timeline view that lets users to view a graph of the object detections over time. The timeline view may have a "time-lapse" mode that lets the user define a certain time window. The user may play, pause, fast forward or rewind through the time window in the timeline view to know what was happening at a point of time. The user may also filter the timeline view by parameters like object type and user-defined zones. The users may draw zones on floorplans of the target region for identifying specific areas of interest called "zones". When objects are detected, the system may check whether the object is in a particular zone or not, and then may perform analysis of the object in the said particular zone. For example, the analysis may be done to count a number of objects in the zone, determine aggregate dwell time for the objects in the zone, determine entry or exit time for the objects in the zone and perform spatial or temporal analysis to identify hot and cold spots in the target region.

In an embodiment, the system may use historical data to analyse most common and least common paths individual objects may take as they move around the target region. The historical data may also be used to predict how busy specific areas of the target region are going to be at certain points in time. The historical data and predictions may be further used to recommend workers to take objects through a specific path for an optimal efficiency in the target region. It may be understood that in order to integrate such features in the system, a plurality of data sources may need to be integrated along with the historical data in order to combine data from multiple sensors, such as, RFID, barcode scanning stations, existing inventory lists, building and/or floor access logs, LIDAR, RADAR, Wi-Fi network logs, Bluetooth network logs, and the likes.

It may be noted that in an embodiment, the wide-angle camera may comprise the fisheye lens applied to an optical sensor like a solid-state LIDAR (Light Detection and Ranging). The fisheye lens may spread out light beams from the LIDAR according to a curvature of the fisheye lens in the 180×180 degrees field of vision on axis' perpendicular to the view direction of the fisheye lens, thus, covering a larger target region. As discussed, the present system could be implemented in such a case to generate two or more virtual images. That is, the techniques of the present disclosure, as discussed above, may be applied to a resulting distorted point cloud image from a LIDAR with a wide-angle lens to generate virtual LIDAR point clouds from predefined view directions. This may greatly reduce the number of LIDAR sensors required to cover the target region, and it makes ultra wide-angle point clouds processable by the model for analysing the two or more virtual images. The model may be a point cloud AI model that has been trained with standard perspective point clouds.

It may be noted that the system of the present disclosure as implemented for processing images related to the target region may first read a camera configuration for each of cameras of a plurality of cameras positioned for capturing images of the target region. For each camera, depending on the camera configuration a decision about a perspective of the camera may be made. If the camera is the wide-angle camera, one or more target buffers may be allocated with the image resolution same as the image resolution of the two or more virtual cameras. Next, the system may be connected to the video stream of the wide-angle camera and may map the wide-angle image frame to the one or more target buffers. For each virtual camera, the wide-angle image from the wide-angle camera may be inverse transformed into the one or more target buffers in order to generate the two or more virtual images. Finally, the two or more virtual images may be analysed by the model.

Moreover, the present description also relates to the method for processing images related to the target region as described above. The various embodiments and variants disclosed above apply mutatis mutandis to the method for processing images related to the target region.

The method may comprise analysing each of the generated two or more virtual images in one of multiple processing threads of a computing arrangement.

Defining the two or more virtual camera views may be based on one or more of a horizontal resolution of the received at least one image, a vertical resolution of the received at least one image, a horizontal field of vision in the received at least one image and a vertical field of vision in the received at least one image.

Defining the two or more virtual camera views may be based on one or more of: a pan, a tilt and a roll required for the two or more virtual camera views, in view of the received at least one image.

The said model may be implemented to analyse the generated two or more virtual images for at least one of: an object detection, an object tracking and an object classification, in the target region.

The one or more image parameters may comprise at least one of: image resolution and bit depth.

The wide-angle camera may be a fisheye camera.

In an embodiment, the target regions are in a grid layout combined within a memory buffer. The method may comprise the model scaling down and processing the combined target buffer in one step, the method comprising:

Reserving a target buffer in a resolution that is a multiple of the target resolution;

Reading an image frame from a fisheye camera;

Running a virtual camera extraction algorithm for each target view and writing the resulting images into the respective section of the combined target buffer;

Scaling down the combined target buffer to match the input resolution of the model;

Running the model once on the combined target buffer; and

Converting the resulting list of object detections and their positions back into the actual positions In an embodiment, the target regions are scaled down and filling the grid layout (e.g. 208×208 per view) combined within a memory buffer. The method may comprise the model scaling down and processing the combined target buffer in one step, the method comprising:

Reserving a target buffer in a resolution that is a multiple of the target resolution;
Reading an image frame from a fisheye camera;
Running a virtual camera extraction algorithm for each target view and writing the resulting images into the respective section of the combined target buffer;
Running the model once on the combined target buffer; and
Converting the resulting list of object detections and their positions back into the actual positions In many computing arrangements, running the model is the step which requires the most computing power and is therefore the most expensive. This method is beneficial as it only requires the model to be run once, which reduces the per frame computing time and the cost. The reduced per frame computing time allows the method to be performed on a system with less computing power, such as in embedded computers.

Moreover, the present description also relates to a computer program product comprising a non-transitory computer-readable storage medium having computer-readable instructions stored thereon. Herein, the computer-readable instructions are executable by a computing arrangement comprising multiple processing threads to execute the method.

The system and the method are advantageous for processing images related to the target region. Contrary to the conventional de-warping or rectification techniques for analysis of the wide-angle images by the model in which the wide-angle images are scaled down causing loss of information as pixels get discarded to match the image parameters of the input of the model, the processing of the wide-angle image by the system and the method of the present disclosure has generally no data loss due to downscaling and the generated two or more virtual images are fed into the model as if received form two or more traditional cameras with normal lens. As a consequence, the models trained on the image parameters for the traditional cameras may be easily implemented to process the images from the wide-angle camera that covers a far larger field of vision. Additionally, classical de-warping produces one perspective view from one fisheye camera and cannot usually be defined by properties of actual physical cameras like pan, roll and tilt of a physical subpixel camera placed at the same physical position as the fisheye camera, which is rectified by using the techniques as proposed in the embodiments of the present disclosure.

DETAILED DESCRIPTION OF DRAWINGS

Figure 1:
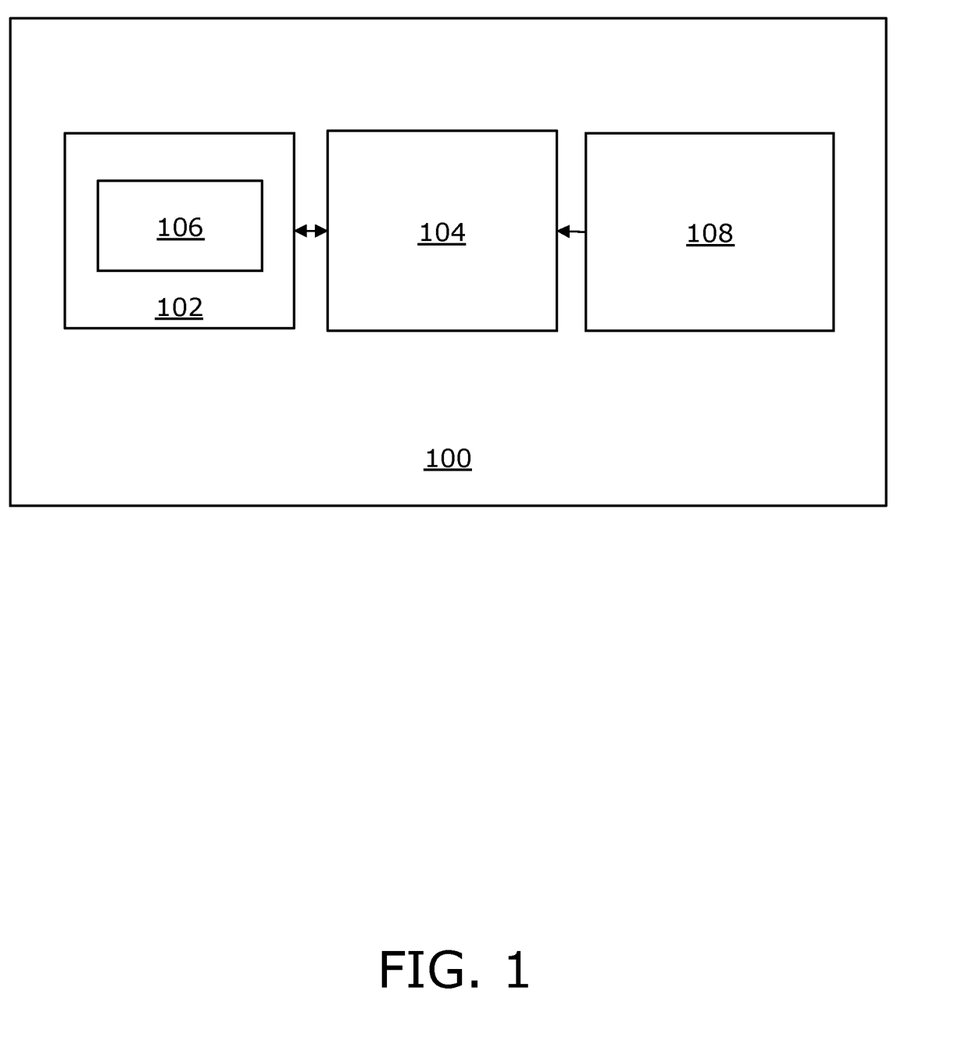
FIG. 1 is a block diagram illustration of a system for processing images related to a target region, in accordance with various embodiments of the present disclosure.

Referring to FIG. 1, there is shown a block diagram illustration of a system 100 for processing images related to a target region, in accordance with various embodiments of the present disclosure. The system comprises a memory 102 and a computing arrangement 104. The computing arrangement 104 is in communication with the memory 102. The computing arrangement 104 is configured to define one or more target buffers 106 in the memory 102 of a size corresponding to one or more image parameters to be used as an input to a model to be implemented for the processing the images. The computing arrangement 104 is configured to receive at least one image of the target region from a wide-angle camera 108. The computing arrangement 104 is configured to define two or more virtual camera views from the received at least one image to be utilized for processing images related to the target region. The computing arrangement 104 is configured to process the at least one image to generate two or more virtual images based on the defined one or more target buffers and the defined two or more virtual camera views. The computing arrangement 104 is configured to implement the said model to analyse the generated two or more virtual images.

Figure 2:
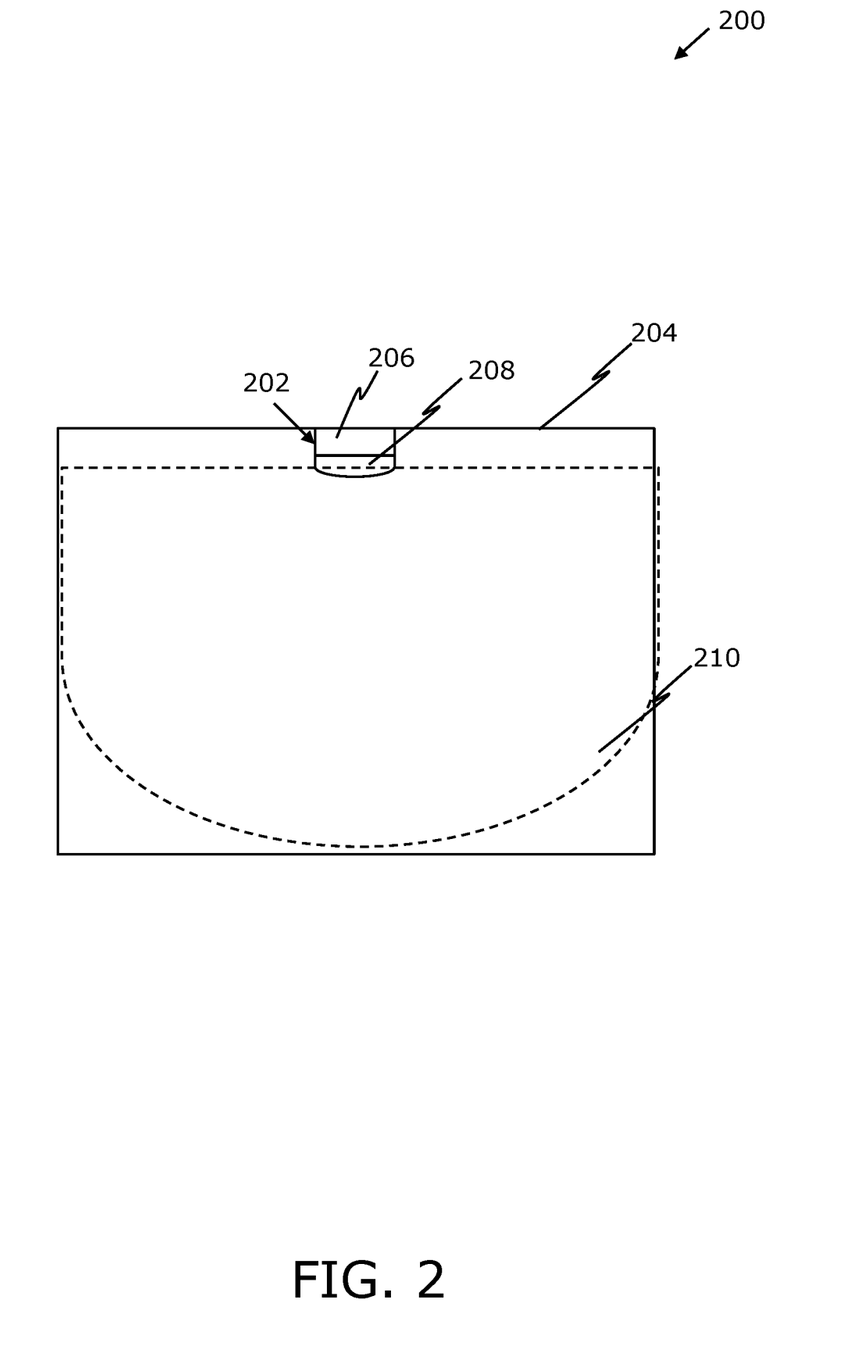
FIG. 2 is a schematic illustration of a field of vision covered by a wide-angle camera mounted on a ceiling of a room, in accordance with an embodiment of the present disclosure.

Referring to FIG. 2, there is shown a schematic illustration of a field-of-view covered by a wide-angle camera 202 mounted on a ceiling 204 of a room 200, in accordance with an embodiment of the present disclosure. The wide-angle camera 202 comprises an optical sensor 206 and a fisheye lens 208. In some examples, the optical sensor 206 is a LIDAR (Light Detection and Ranging) sensor. As may be seen, the wide-angle camera 202 mounted on the ceiling 204 of the room 200, generally, fully covers the target region 210.

Figure 3:
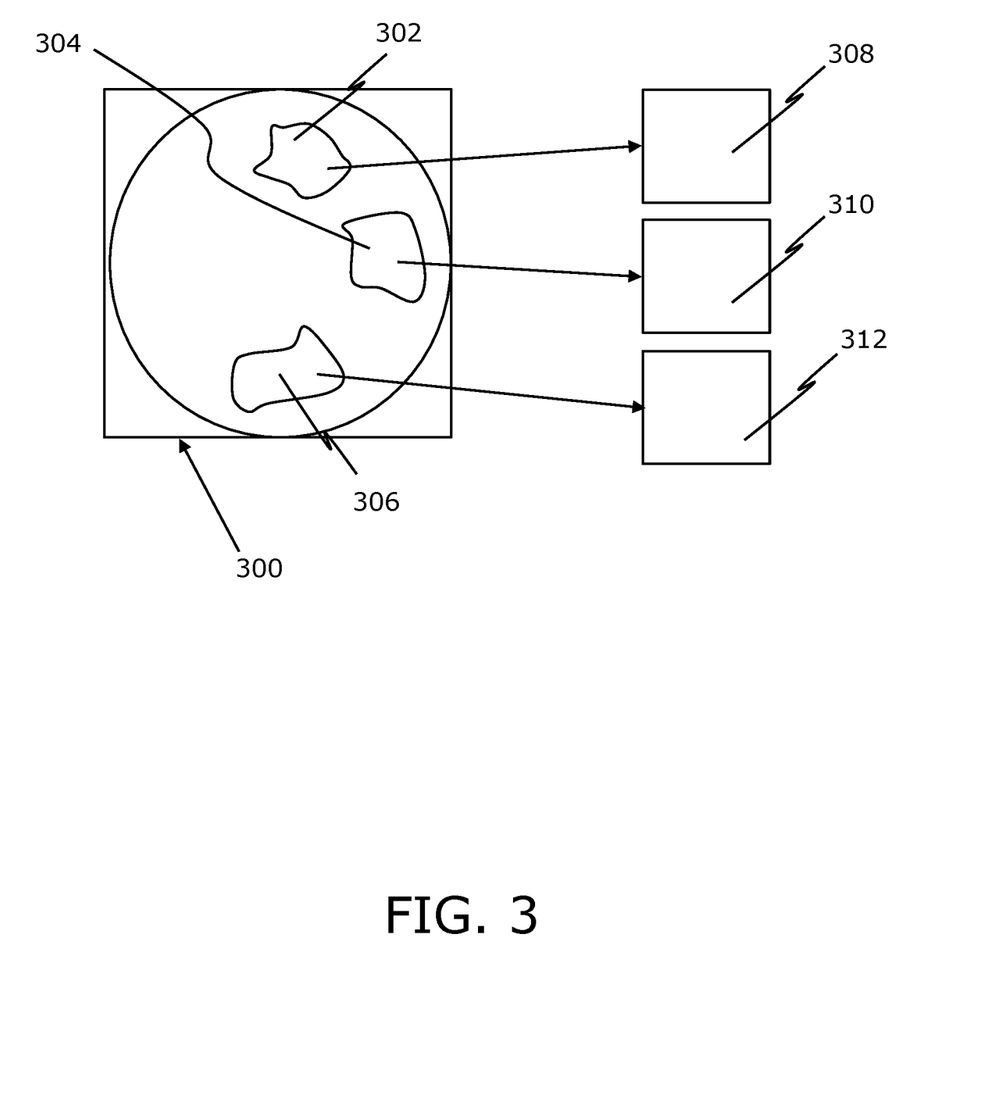
FIG. 3 is a schematic illustration of implementation for processing a wide-angle image for generating three virtual images therefrom, in accordance with an embodiment of the present disclosure.

Referring to FIG. 3, there is shown a schematic illustration of implementation for processing a wide-angle image 300 for generating three virtual images 302, 304 and 306, in accordance with an embodiment of the present disclosure. The wide-angle image 300 is the at least one image of the target region as received by the computing arrangement (such as the computing arrangement 104 of FIG. 1) from the wide-angle camera (such as the wide-angle camera 108 of FIG. 1). Herein, the computing arrangement defines three virtual camera views 302, 304 and 306. The computing arrangement processes three virtual camera views 302, 304 and 306 to generate three virtual images 308, 310 and 312 based on the defined one or more target buffers and the defined three virtual camera views 302, 304 and 306.

Figure 4A:
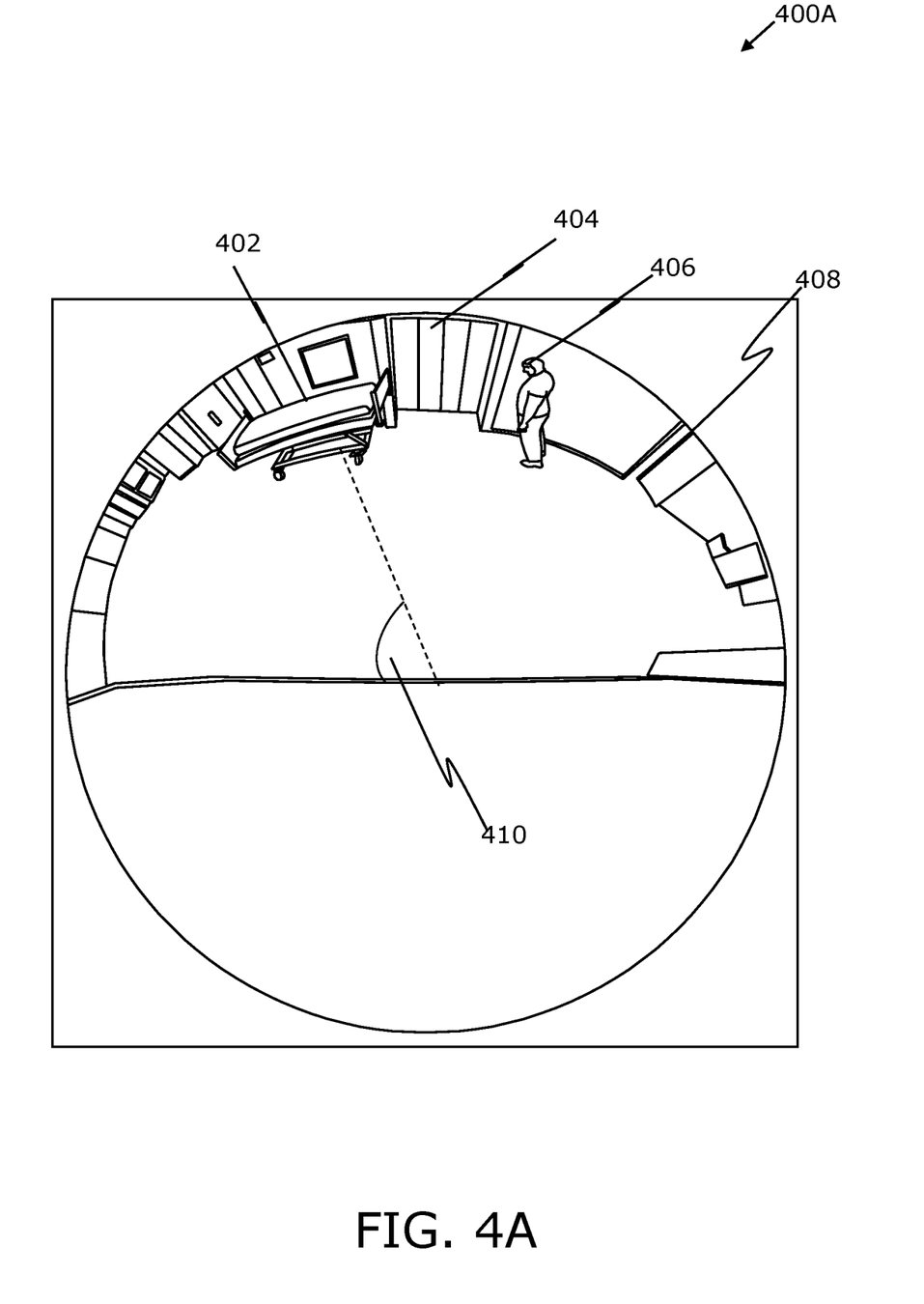
FIG. 4A is an exemplary illustration of the wide-angle image, in accordance with an embodiment of the present disclosure.

Referring to FIG. 4A, there is shown an exemplary illustration of a wide-angle image 400A, in accordance with an embodiment of the present disclosure. Herein, for example, the wide-angle image 400 is an image of a room. The wide-angle image 400 includes a stretcher 402, a lift 404, a man 406 and a door 408. The stretcher 402 is placed at an angle (as represented by numeral 410) with respect to a plane of the wide-angle image 400.

Figure 4B:
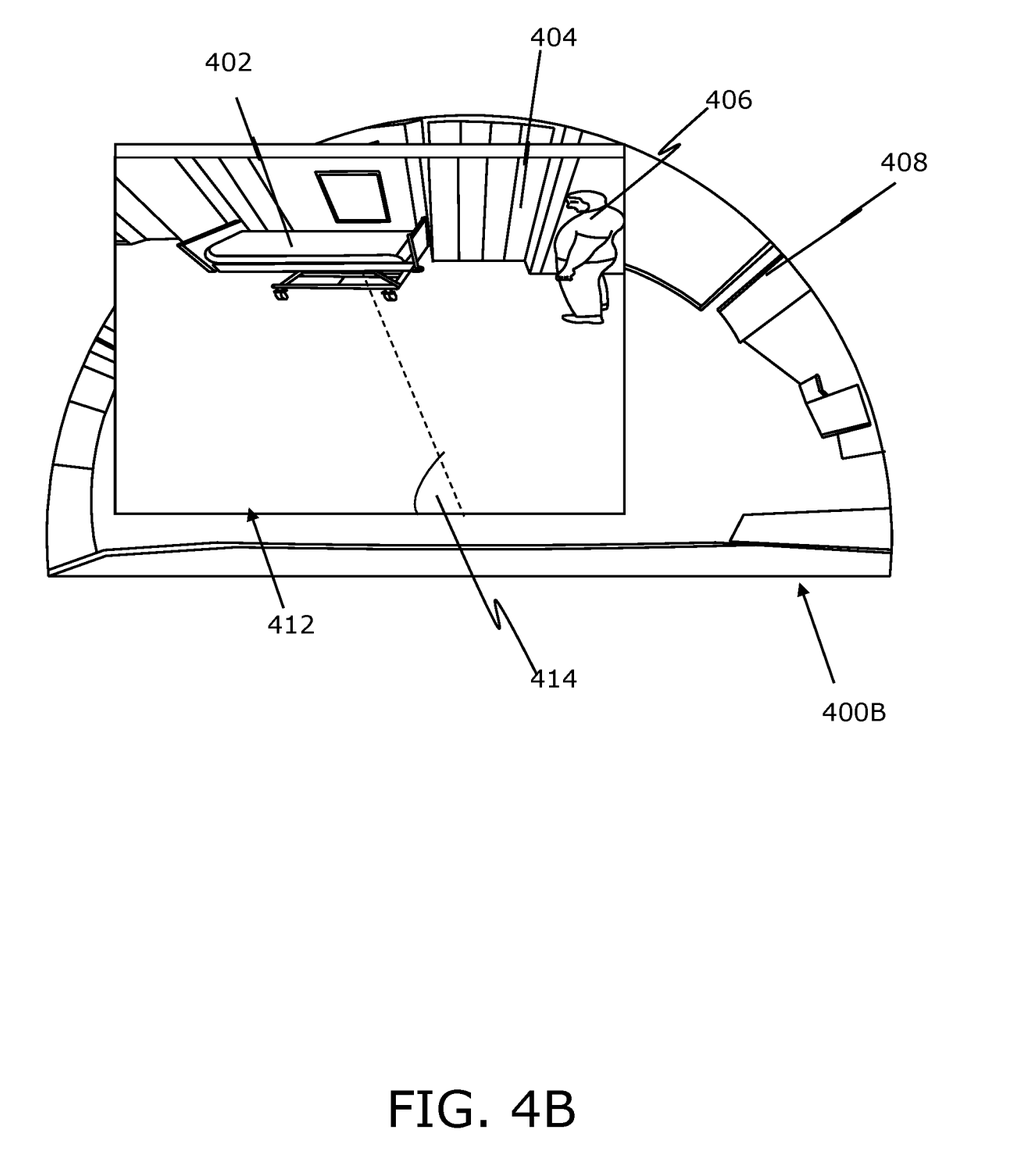
FIG. 4B is an exemplary illustration of one virtual camera view superimposed on the wide-angle image as generated therefrom, in accordance with an embodiment of the present disclosure.

Referring to FIG. 4B, there is shown an exemplary illustration of one virtual camera view 412 superimposed on the wide-angle image 400B as generated therefrom, in accordance with an embodiment of the present disclosure. The wide-angle image 400B is an image of the room. The wide-angle image 400B is a portion of the wide-angle image 400A of FIG. 4A. Herein, irrelevant portions of the wide-angle image 400A are cropped to obtain the wide-angle image 400B. The wide-angle image 400B includes a stretcher 402, a lift 404, a man 406 and a door 408. The virtual camera view 412 is rectangular in shape and is defined to include the stretcher 402, the lift 404 and the man 406. The stretcher 402 makes an angle (as represented by numeral 414). In order to convert the wide-angle image 400B to the virtual camera view 412, the angle 410 needs to be transformed to the angle 414. The virtual camera view 412 has the size that matches the image parameters of the implemented model.

Figure 4C:
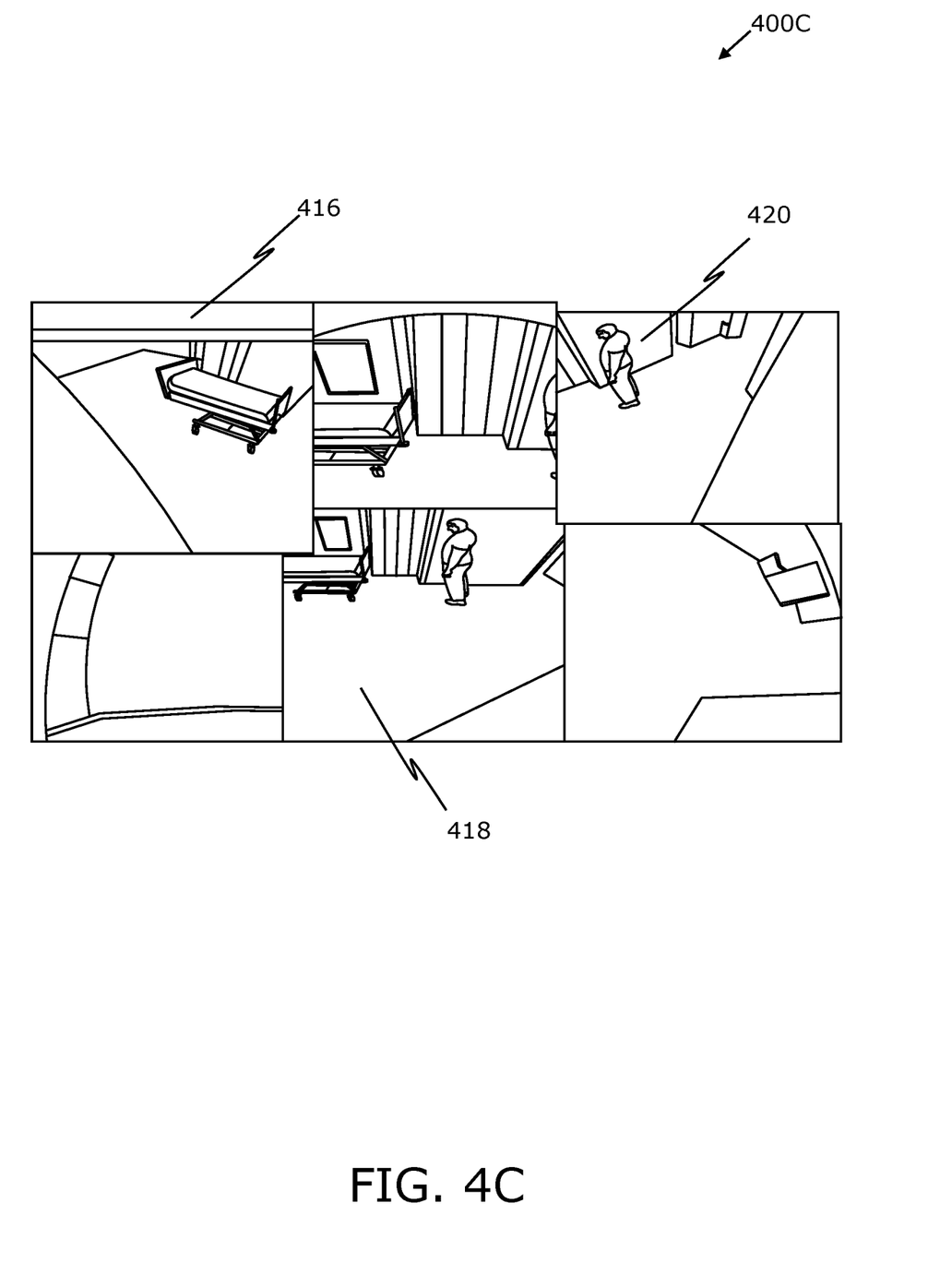
FIG. 4C there is an exemplary illustration of three virtual camera views superimposed on the wide-angle image as generated therefrom, in accordance with an embodiment of the present disclosure.

Referring to FIG. 4C, there is shown an exemplary illustration of three virtual camera views 416, 418 and 420 superimposed on the wide-angle image 400C as generated therefrom, in accordance with an embodiment of the present disclosure. The wide-angle image 400C is a portion of the wide-angle image 400A of FIG. 4A. It may be observed from FIG. 4C that the virtual camera view 416 includes the stretcher 402, the virtual camera view 418 includes the stretcher 402, the lift 404 and the man 406 and the virtual camera view 420 includes the man 406 and some portions of the lift 404 and the door 408. Each of the virtual camera views 416, 418, 420 has the size that matches the image parameters of the implemented model.

Figure 4D:
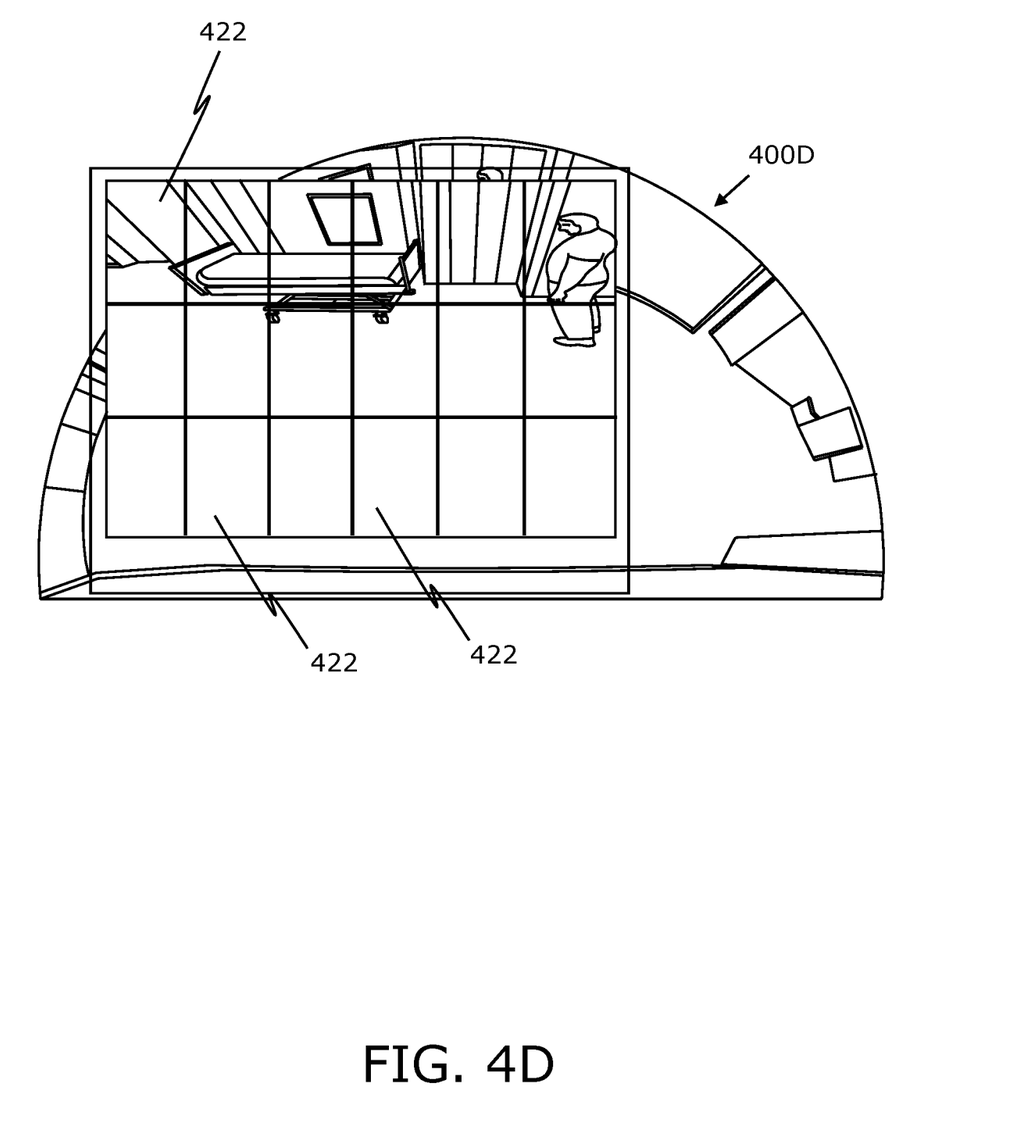
FIG. 4D is an exemplary illustration of plurality of virtual camera views superimposed on the wide-angle image as generated therefrom, in accordance with an embodiment of the present disclosure.

Referring to FIG. 4D, there is shown an exemplary illustration of plurality of virtual camera views 422 superimposed on the wide-angle image 400D as generated therefrom, in accordance with an embodiment of the present disclosure. It may be observed from FIG. 4D that the plurality of virtual camera views 422 comprises eighteen virtual camera views. Each of the virtual camera views 422 has the size that matches the image parameters of the implemented model.

Figure 4E:
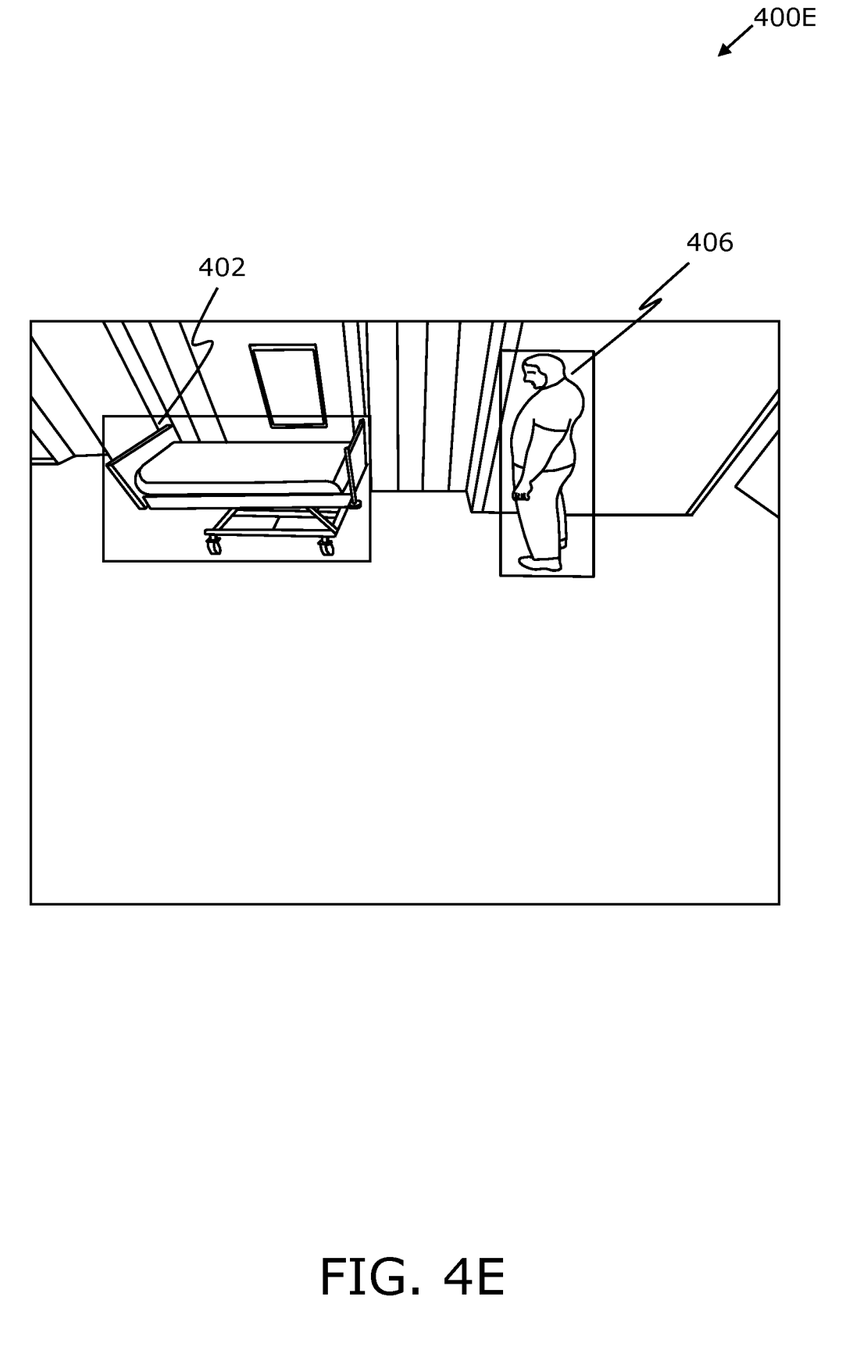
FIG. 4E is an exemplary illustration of implementation of the present system for processing the virtual image by a model to detect objects therein, in accordance with an embodiment of the present disclosure.

Referring to FIG. 4E, there is shown an exemplary illustration of the virtual image 400E (as generated from the at least one image captured by a wide-angle camera) highlighting detected objects, in accordance with an embodiment of the present disclosure. The virtual image 400E is analysed by the model for object detection and object classification. It may be observed from FIG. 4E that two objects are detected, the two objects being the stretcher 402 and the man 406. The detected objects are then classified into static objects and dynamic objects. Herein, the objects that are not moving are static objects and the objects that move around are dynamic objects. For instance, in the present example, the stretcher 402 is classified as a static object and the man 406 is classified as a dynamic object.

Figure 5:
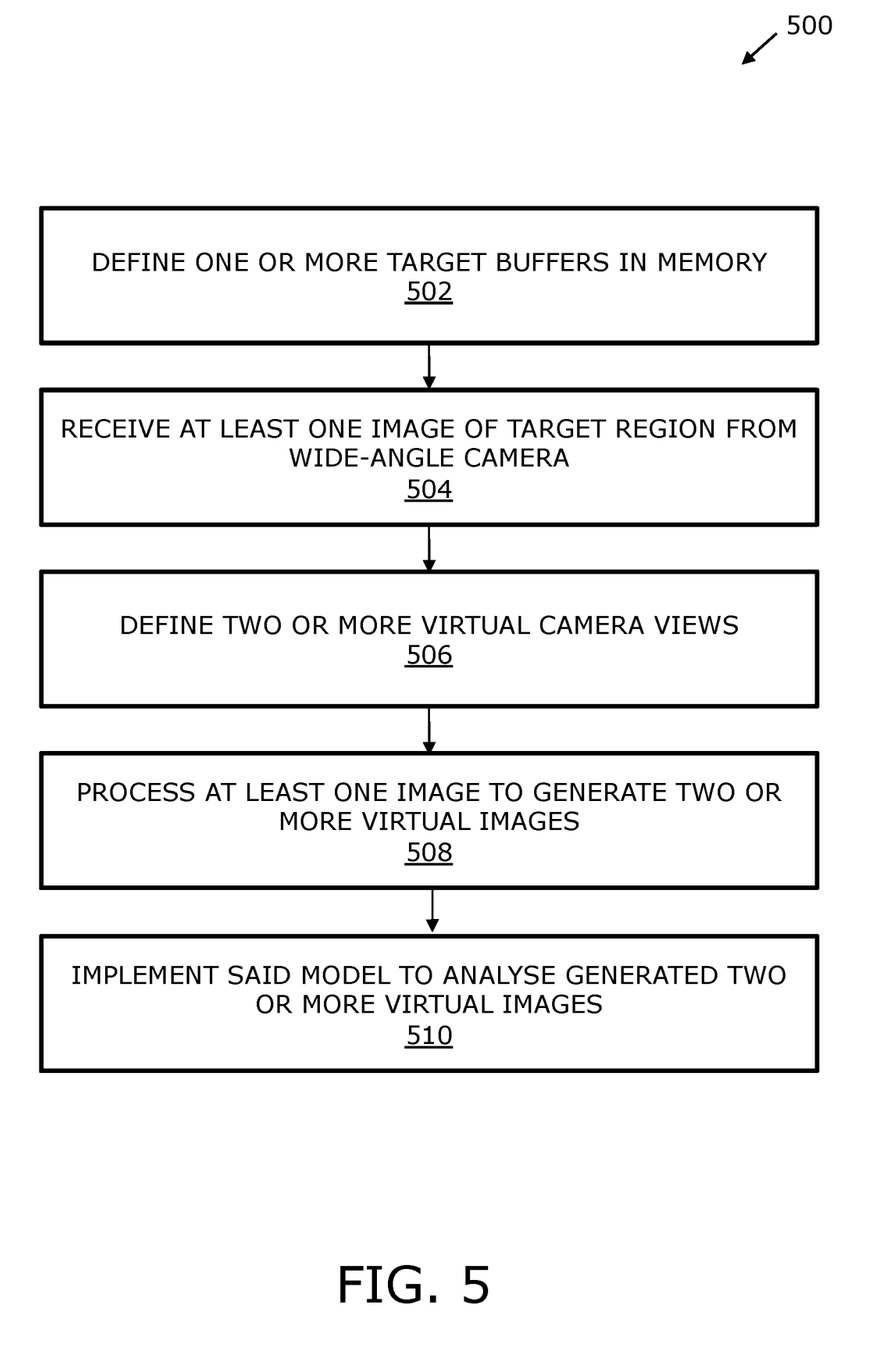
FIG. 5 is a flowchart of a method for processing images related to the target region, in accordance with an embodiment of the present disclosure.

Referring to FIG. 5, there is shown a flowchart 500 of a method for processing images related to the target region, in accordance with an embodiment of the present disclosure. The method comprises, at step 502, defining one or more target buffers in the memory. Herein, one or more target buffers are defined in the memory of the size corresponding to one or more image parameters to be used as the input to the model to be implemented for the processing the images. The method comprises, at step 504, receiving at least one image of the target region from the wide-angle camera. The method comprises, at step 506, defining two or more virtual camera views. Herein, two or more virtual camera views are defined from the received at least one image to be utilized for processing images related to the target region. The method comprises, at step 508, processing the at least one image to generate two or more virtual images. Herein, the at least one image is processed to generate two or more virtual images based on the defined one or more target buffers and the defined two or more virtual camera views. The method comprises, at step 510, implementing the said model to analyse the generated two or more virtual images.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for processing images related to a target region, the system comprising:
a memory; and
a computing arrangement in communication with the memory, the computing arrangement configured to:
define one or more target buffers, in the memory of a size corresponding to one or more image parameters to be used as an input to a plurality of models to be implemented for the processing the images;
receive at least one image of the target region from a wide-angle camera comprising a fisheye lens employing an optical sensor configured to capture a 360° or 180° curved image;
define two or more virtual camera views from the received at least one image to be utilized for processing images related to the target region;
transform the at least one image to generate two or more virtual images based on the defined one or more target buffers and the defined two or more virtual camera views, wherein each of the two or more virtual images is generated from a predefined view directions; and
implement the plurality of models to analyse the generated two or more virtual images, wherein the plurality of models comprises:
a first model configured to employ current and recent history of an object in the generated two or more virtual images to predict a future action for the object; and
a second model configured for at least one of an object detection, an object tracking, and an object classification, in the target region, wherein the object tracking includes tracking movement of objects across virtual camera views based on view directions of the virtual camera views, and wherein the object classification includes classifying detected objects based on predefined classes.

2. The system of claim 1, wherein the computing arrangement comprises multiple processing threads, and wherein each of the generated two or more virtual images is analysed in one of the multiple processing threads therein.

3. The system of claim 1, wherein defining the two or more virtual camera views is based on one or more of: a horizontal resolution of the received at least one image, a vertical resolution of the received at least one image, a horizontal field of vision in the received at least one image and a vertical field of vision in the received at least one image.

4. The system of claim 1, wherein defining the two or more virtual camera views is based on one or more of: a pan, a tilt and a roll required for the two or more virtual camera views, in view of the received at least one image.

5. The system of claim 1, wherein the one or more image parameters comprises at least one of: image resolution and bit depth.

6. The system of claim 1, wherein the wide-angle camera is a fisheye camera.

7. A method for processing images related to a target region, the method comprising:
defining one or more target buffers in a memory of a size corresponding to one or more image parameters to be used as an input to a plurality of models to be implemented for the processing the images;
receiving at least one image of the target region from a wide-angle camera comprising a fisheye lens employing an optical sensor configured to capture a 360° or 180° curved image;
defining two or more virtual camera views from the received at least one image to be utilized for processing images related to the target region;

transforming the at least one image to generate two or more virtual images based on the defined one or more target buffers and the defined two or more virtual camera views, wherein each of the two or more virtual images is generated from a predefined view directions; and implementing the plurality of models to analyse the generated two or more virtual images, wherein the plurality of models comprises:

a first model configured to employ current and recent history of an object in the generated two or more virtual images to predict a future action for the object; and a second model configured for at least one of an object detection, an object tracking, and an object classification, in the target region, wherein the object tracking includes tracking movement of objects across virtual camera views based on view directions of the virtual camera views, and wherein the object classification includes classifying detected objects based on predefined classes.

8. The method of claim 7, further comprising analyzing each of the generated two or more virtual images in one of multiple processing threads of a computing arrangement.

9. The method of claim 7, wherein defining the two or more virtual camera views is based on one or more of: a horizontal resolution of the received at least one image, a vertical resolution of the received at least one image, a horizontal field of vision in the received at least one image and a vertical field of vision in the received at least one image.

10. The method of claim 7, wherein defining the two or more virtual camera views is based on one or more of: a pan, a tilt and a roll required for the two or more virtual camera views, in view of the received at least one image.

11. The method of claim 7, wherein the one or more image parameters comprises at least one of: image resolution and bit depth.

12. The method of claim 7, wherein the wide-angle camera is a fisheye camera.

13. A computer program product comprising a non-transitory computer-readable storage medium having computer-readable instructions stored thereon, the computer-readable instructions being executable by a computing arrangement comprising multiple processing threads to execute the method of claim 7.

* * * * *